United States Patent
Zimmermann et al.

(10) Patent No.: US 7,406,771 B2
(45) Date of Patent: Aug. 5, 2008

(54) PROTECTIVE SHIELD FOR A FREE-CUTTING TOOL

(75) Inventors: Helmut Zimmermann, Berglen (DE); Roland Schierling, Affalterbach (DE); Johannes Menzel, Wernau (DE); Kai-Ulrich Machens, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/487,381

(22) Filed: Jul. 17, 2006

(65) Prior Publication Data
US 2007/0022614 A1  Feb. 1, 2007

(30) Foreign Application Priority Data
Jul. 27, 2005  (DE)  ........................ 10 2005 035 024

(51) Int. Cl.
*A01D 34/416* (2006.01)
*A01D 75/18* (2006.01)
(52) U.S. Cl. .......................................... 30/276; 30/286
(58) Field of Classification Search .................. 30/276, 30/286, 347; 56/12.7, 17.4
See application file for complete search history.

(56) References Cited

U.S. PATENT DOCUMENTS

| | | | | |
|---|---|---|---|---|
| 4,052,789 A * | 10/1977 | Ballas, Sr. | .................... | 30/276 |
| 4,550,499 A * | 11/1985 | Ruzicka | ...................... | 30/276 |
| 4,651,422 A * | 3/1987 | Everts | .......................... | 30/347 |
| 4,864,728 A * | 9/1989 | Kloft et al. | .................... | 30/276 |
| 5,060,383 A * | 10/1991 | Ratkiewich | ................... | 30/276 |
| 5,351,403 A | 10/1994 | Becker et al. | | |
| 6,052,976 A * | 4/2000 | Cellini et al. | ................. | 56/17.4 |
| 6,658,741 B2 * | 12/2003 | Paluszek | ....................... | 30/276 |
| 6,742,263 B2 * | 6/2004 | Ellson et al. | ................... | 30/276 |

\* cited by examiner

*Primary Examiner*—Hwei-Siu C. Payer
(74) *Attorney, Agent, or Firm*—Walter Ottesen

(57) ABSTRACT

A protective shield (2) is provided for a free-cutting tool (1). The free-cutting tool has a cutterhead (4) rotatable about a rotational axis (3) and carries a cutting filament (5). For a rotating cutterhead (4), the cutting filament (5) rotates in a rotational direction (10), aligns itself approximately radially to the rotational axis (3) and defines a cutting circle (6) having a constructively pregiven nominal radius (R). The cutting radius (6) is at least partially covered by the protective shield (2). A cut-to-length knife (7) having a cutting edge (8) for cutting the cutting filament (5) to length is mounted on the protective shield (2) in the peripheral region thereof. The cut-to-length knife (7) is mounted on the protective shield (2) to be moveable back and forth between a cutting position (11) and a rest position (12). The cutting edge (8) lies in the plane of the cutting circle (6) in the cutting position (11) and has the nominal radius (R) to the rotational axis (3) and, in the rest position (12), the cutting edge (8) lies outside of the cutting circle (6).

12 Claims, 4 Drawing Sheets

PROTECTIVE SHIELD FOR A FREE-CUTTING TOOL

CROSS REFERENCE TO RELATED APPLICATION

This application claims priority of German patent application no. 10 2005 035 024.0, filed Jul. 27, 2005, the entire content of which is incorporated herein by reference.

FIELD OF THE INVENTION

The invention relates to a protective shield for a free-cutting tool having a cutterhead rotatable about a rotational axis. The cutterhead carries a cutting filament which rotates in a rotational direction when the cutterhead is rotated and aligns itself approximately radially to the rotational axis. The cutting filament determines a cutting circle covered at least partially by the protective shield and the cutting circle has a nominal radius which is pregiven by the configuration of the free-cutting tool. A cut-to-length knife having a cutting edge is mounted on the protective shield. The cut-to-length knife is arranged at the peripheral region of the cutting circle and cuts the cutting filament into lengths.

BACKGROUND OF THE INVENTION

Motorized scythes or free-cutting tools of known configuration have a drive motor especially in the form of an internal combustion engine which drives a cutterhead via a shaft supported in a guide tube. The cutterhead is rotatably driven about a rotational axis. The cutterhead carries a cutting filament which rotates in a rotational direction when the cutterhead rotates. The cutting filament aligns itself approximately radially to the rotational axis as a consequence of the developed centrifugal forces. In its rotational direction, the cutting filament defines a cutting circle having a nominal radius which is constructively pregiven. A protective shield is provided in the region of the cutterhead and this shield covers the cutting filament at least partially over its cutting circle.

For cutting different plant matter such as grass or the like, the free-cutting tool is aligned in a usual work position so that the cutting circle lies approximately parallel to the surface to be processed. The rotating cutting filament cuts the plant matter in the plane of the cutting circle.

The cutting filament is made of a flexible plastic and is subjected to wear which causes the cutting filament to become shortened. A cutting circle arises with a radius which is less than the nominal radius pregiven constructively. The cutting capacity of the free-cutting tool is reduced.

A manual or automatic readjustment of the cutting filament is necessary from time to time. For this purpose, the cutting filament is moved out of a magazine from the cutterhead in order to compensate the loss of length caused by wear. The length compensation takes place mostly with an excess. A cut-to-length knife for the cutting filament is mounted on the protective shield at the peripheral region of the cutting circle in order to prevent the formation of a cutting circle having too large a radius, that is, in order to adjust the cutting circle to its nominal radius pregiven constructively. In the first rotational movements following the length compensation, a free end of the excessively long cutting filament impinges upon the cutting edge of the cut-to-length knife and is automatically cut to the length which is not to be exceeded. A nominal radius is thereby imparted to the cutting circle.

A free-cutting tool having a protective shield and an integrated cut-to-length knife is disclosed in U.S. Pat. No. 5,351, 403. The cut-to-length knife is mounted at the peripheral end of the cutting circle. Its cutting edge extends perpendicularly to the cutting circle and axially parallel to the rotational axis of the cutterhead. After the automatic cutting to length of the cutting filament by means of the above-mentioned cut-to-length knife, the cutting filament has a free outer end which, in further operation, is cyclically guided past the cutting edge of the cut-to-length knife at high rpm. In this region, an unwanted high level of noise is generated.

SUMMARY OF THE INVENTION

It is an object of the invention to improve the protective shield for a free-cutting tool in such a manner that a reduced development of noise results with an effective cut-to-length function for the cutting filament.

The protective shield assembly of the invention is for a free-cutting tool including a cutterhead rotatably driven about a rotational axis, the cutterhead carrying a cutting filament rotating with the cutterhead and extending approximately radially of the rotational axis as the cutterhead rotates, the cutting filament defining a cutting circle having a nominal radius and a peripheral region. The protective shield assembly includes: a protective shield at least partially covering the cutting circle; a cut-to-length knife moveably mounted on the protective shield in the peripheral region of the cutting circle; the cut-to-length knife having a cutting edge for cutting the cutting filament to a length corresponding to the nominal radius; and, the cut-to-length knife being moveable back and forth between a rest position wherein the cutting edge lies outside of the cutting circle and a cutting position wherein the cutting edge lies in the plane of the cutting circle at a location corresponding to the nominal radius.

A protective shield for a free-cutting tool having a cut-to-length knife is proposed wherein the cut-to-length knife is attached on the protective shield so as to be moveable back and forth between a cutting position and a rest position. In the cutting position, the cutting edge lies in the plane of the cutting circle and at the nominal radius to the rotational axis and, in the rest position, the cutting edge lies outside of the cutting circle. Preferably, a movement of the cut-to-length knife out of the rest position into the cutting position is provided by the action of the excessively long cutting filament moved about the rotational axis. The excessively long cutting filament impacts upon the cut-to-length knife in the rest position and moves this knife into the cutting position as a consequence of the impact energy. Here, the cutting filament is cut to length in correspondence to the constructively pregiven nominal radius. Thereafter, a return of the cut-to-length knife into its rest position takes place wherein the cut-to-length knife, that is, its cutting edge, lies outside of the cutting circle. The cutting filament passes over the cutting circle having the nominal radius during the further operation and carries out its circular movement at a spacing to the cut-to-length knife. The spacing to the cutting circle caused by the return movement of the cut-to-length knife into the rest position significantly reduces the development of noise.

In a practical further embodiment, the cut-to-length knife is spring biased in the direction of the rest position from the cutting position. When the excessively long cutting filament impacts onto the cut-to-length knife disposed at first in its rest position, the impact energy of the cutting filament also leads to an increased pretensioning of the return spring in addition to a movement of the cut-to-length knife into the cutting position. A portion of the impact energy of the cutting filament is stored in the return spring as potential energy. After the completed cut-to-length operation, the freshly cut end of the cutting filament can no longer hold the cut-to-length knife in the cutting position against the spring pretensioning thereof. The energy stored in the return spring returns the cut-to-length knife automatically into the rest position. Cutting to length and the return positioning into the noise-reduced rest position take place completely automatically without manual assistance. Faulty manipulation by the operator is avoided and the work comfort is significantly increased.

The cut-to-length knife can, for example, be guided longitudinally displaceably along an inclined plane. Preferably, the cut-to-length knife is pivotally supported about a pivotal axis on the protective shield between the cutting position and the rest position. With slight bearing friction, a significant insensitivity against contamination is given.

In a practical embodiment, the pivot axis of the cut-to-length knife lies at least approximately parallel to the rotational axis of the cutterhead. The cutting edge of the cut-to-length knife lies in the plane of the cutting circle in the rest position and in the cutting position. The cutting edge, referred to the pivot axis of the cut-to-length knife, is arranged running ahead or leading against the rotational direction of the cutting filament in the rest position. The arrangement causes a gentle stepwise cutting to length of the cutting filament. The excessively long cutting filament impacts first against the cutting edge of the cut-to-length knife in the rest position whereby a first cutting operation is initiated. The arrangement of the cutting edge running ahead effects a subsequent pivot movement with a radially inwardly directed component entrained with the cutting filament whereby the kinetic impact energy is optimally utilized. In the radially inner cutting position, a further cutting to length of the cutting filament to the nominal amount takes place. The arrangement is constructively simple in configuration. The radially outwardly lying rest position effects a maintaining of the noise-reducing distance to the cutting circle even when the cutting filament is deflected out of its cutting plane under the operating load.

The cut-to-length knife is preferably doubly journalled and is configured especially to have a U-shape. Respective support positions are arranged in the regions of the free ends of the U-shaped cut-to-length knife. The pivot movement of the cut-to-length knife is guided cleanly. The support forces at the two support positions of the double bearing are small. With a high effectivity, the arrangement can be configured small and light weight and nonetheless ensure a high resistance to load and a continuously good cut-to-length result.

The spring pretensioning of the cut-to-length knife is matched to the mass inertia of the knife and the operating rpm of the cutterhead in such a manner that the cut-to-length knife, which is deflected out of the rest position, remains at least in the region of the cutting position over the time span of half a revolution of the cutterhead. This preferred configuration is based on the consideration that the cut-to-length knife experiences only a short impact in the direction of the cutting position with the striking of the excessively long cutting filament. The above-mentioned dynamic design causes the cut-to-length knife to remain at least approximately in the cutting position after the first deflection out of the rest position in the short time span of a half revolution of the cutterhead until a second cutting filament mounted offset at 180° impacts. If the cutting filament is not cleanly cut to length with the first impact against the cut-to-length knife, the cutting filament can impact so often against the cutting edge of the cut-to-length knife in the cutting position until a clean separation is produced. Only then is the cut-to-length knife no longer subjected to an impact pulse and this knife returns into the rest position. A clean cutting to length of the cutting filament is ensured.

In a preferred embodiment, the cut-to-length knife is formed from spring steel and is configured as one piece with the return spring. The cut-to-length knife can be formed with little manufacturing complexity as a bending part and be mounted. The single part configuration permits a clearly defined introduction of force from the return spring into the cut-to-length knife which is at least essentially free of wear and not prone to contamination.

The cut-to-length knife is supported on a holder which, in turn, is held form tight on the protective shield, especially by means of a receiving slot. The assembly unit comprising the holder and the cut-to-length knife can be mounted with little complexity and is exchangeable when there is damage or wear.

In a preferred embodiment, stops for limiting the displacement path of the cut-to-length knife are provided. The rest position as well as the cutting position are precisely determined by the stops. An exact adjustment of the nominal radius is ensured as is a precise maintenance of the distance of the cutting knife to the cutting circle in the rest position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
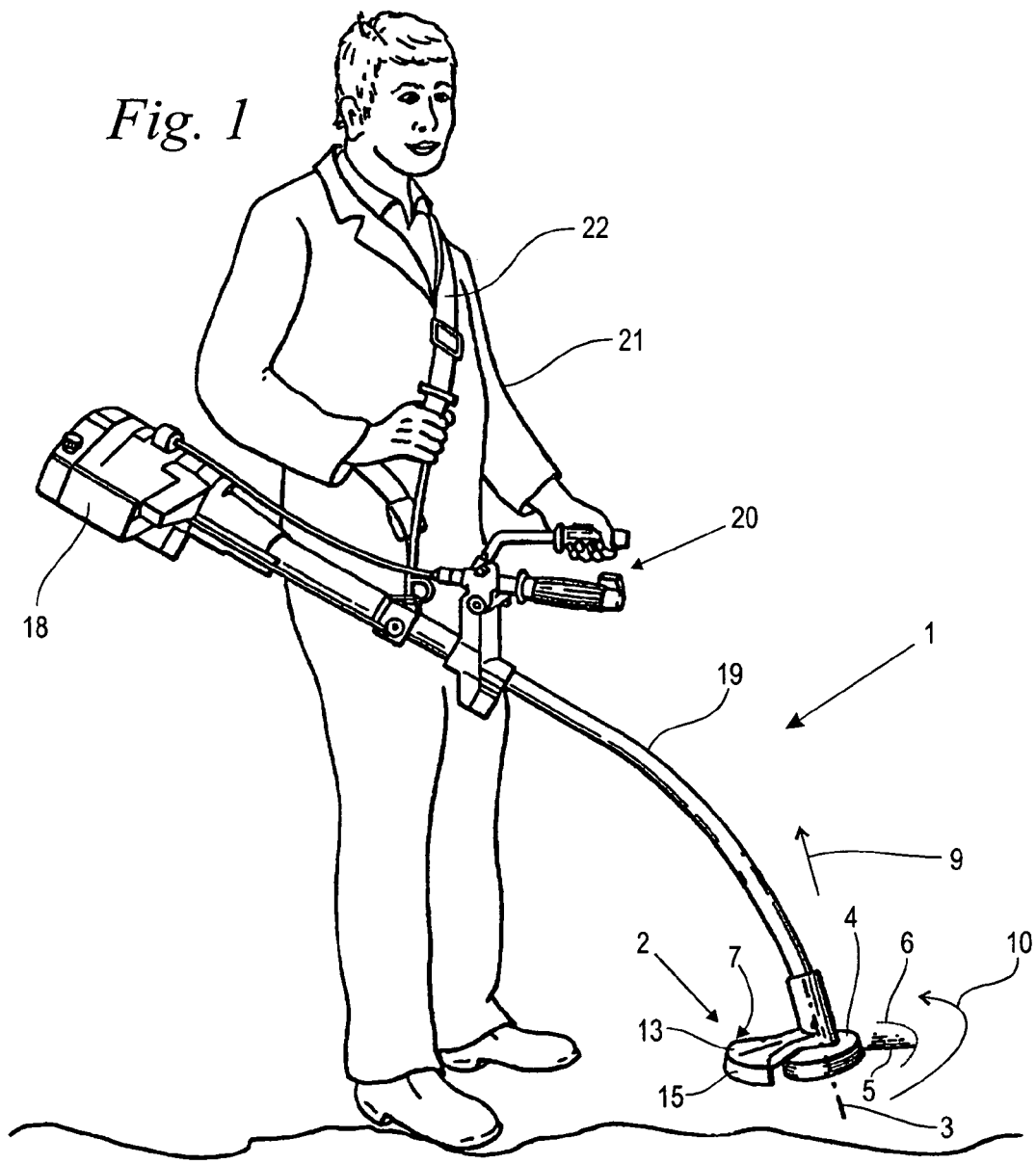
FIG. 1 is an overview showing a free-cutting tool held in the conventional work position with the free-cutting tool having a protective shield and a cut-to-length knife integrated on the inner side thereof.

FIG. 1 shows an operator 21 who is carrying a free-cutting tool 1 in the conventional operating or work position by means of a carrier belt 22. The free-cutting tool 1 includes a guide tube 19. On one end of the guide tube 19, a motor unit 18 is mounted and a cutterhead 4 is mounted on the opposite-lying end. A drive shaft (not shown) runs within the guide tube 19 with which a drive motor (not shown) in the motor unit 18 rotatably drives the cutterhead 4. A handle assembly 20 is provided on the guide tube 19 for guiding the free-cutting tool 1. Operating elements for controlling the drive motor are mounted on the handle assembly 20.

The cutterhead 4 carries two opposite-lying cutting filaments 5 which are offset with respect to each other by 180°. During operation, the cutting filaments 5 together with the cutterhead 4 rotate about a rotational axis 3 in a rotational direction indicated by an arrow 10.

The flexible cutting filament 5 is made of plastic and aligns itself approximately radially to the rotational axis 3 as a consequence of the centrifugal forces arising during rotation. The cutting filament 5 defines a cutting circle 6 indicated in phantom outline.

A protective shield 2 is attached to the apparatus in the region of the cutterhead 4 at the corresponding end of the guide tube 19. The protective shield 2 includes a carrier section 13 which extends approximately radially to the rotational axis 3. A peripheral wall 15 in the form of a cylindrical section is bent over at the outer end of the protective shield.

In the shown conventional work position of the free-cutting tool 1, the rotational axis 3 lies approximately vertically to the ground surface to be worked and the plane of the cutting circle 6 lies approximately parallel to the ground surface. Because of the rotational axis 3, an up direction or axial direction is pregiven which is indicated by an arrow 9. The flat carrier section 13 covers the cutting circle 6 of the cutting filament 5 over an angular region upwardly in the axial direction 9 with this angular region facing away from the operator 21. Over the same angular region, the cutting circle 6 is covered radially toward the outside by the peripheral wall 15. A cut-to-length knife is attached in the protective shield 2 in the peripheral region of the cutting circle 6. The cut-to-length knife 7 will be explained in greater detail hereinafter.

Figure 2:
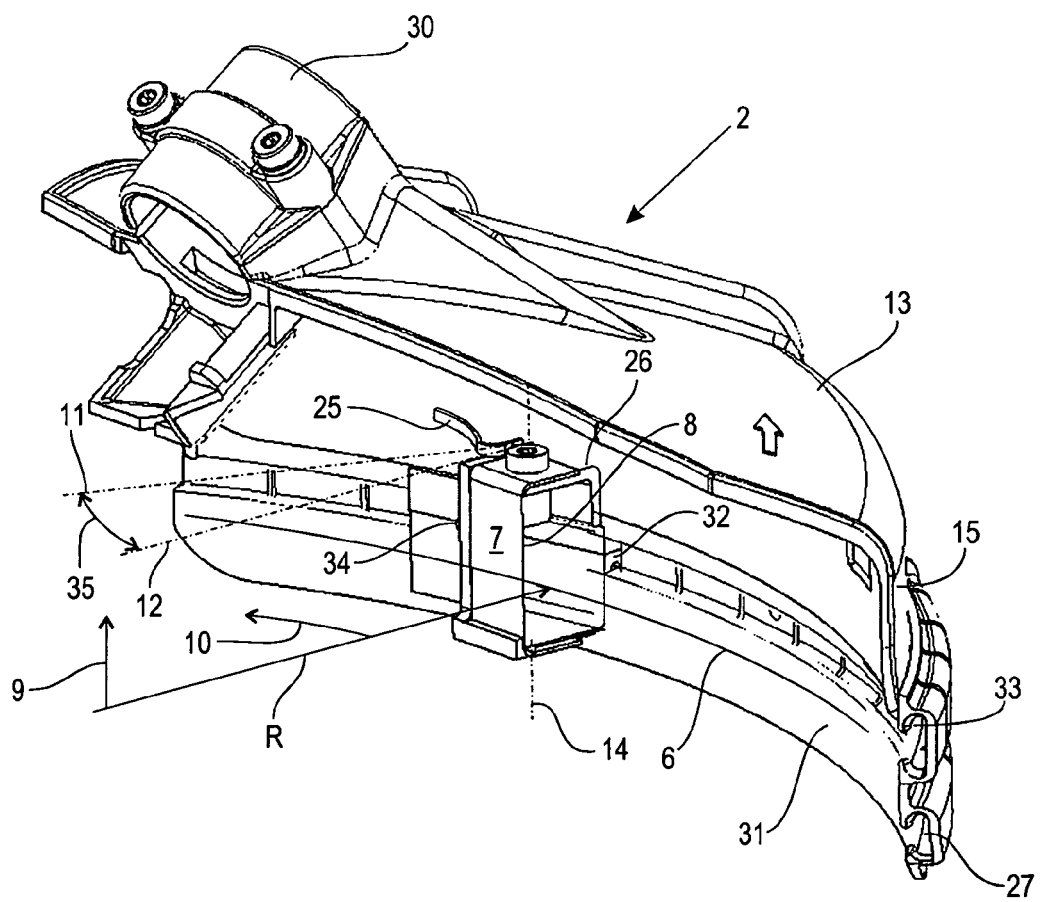
FIG. 2 is an enlarged perspective inner view of the protective shield of the free-cutting tool of FIG. 1 showing details of a cut-to-length knife pivotally held on the protective shield.

FIG. 2 shows a perspective interior view of the protective shield 2 of FIG. 1. A clamp member 30 is formed on the protective shield in the upper region of the carrier section 13 thereof. The protective shield 2 is attached to the guide tube 19 (FIG. 1) of the free-cutting tool 1 by means of the clamping member 30. The peripheral wall 15 extends at an angle in the form of a cylindrical section from the outer edge of the carrier section 13. The peripheral wall 15 comprises a section which is formed as one piece on the carrier section 13. At the lower edge of the peripheral wall 15, a further wall section is attached form tight as a separate component by means of an upper receiving slot 33. In the wall section 31, an additional lower receiving slot 27 is formed with an approximately C-shaped cross section which is parallel to the upper slot 33. The lower receiving slot 27 runs in the peripheral direction of the wall section 31.

A holder 26 is configured as a plastic form piece and carries the cut-to-length knife 7. The assembly unit of holder 26 and cut-to-length knife 7 is attached form tight to the wall section 31 of the protective shield 2 in that a form part 32, which is formed onto the holder 26, lies in the receiving slot 27 with an undercut. The holder 26 is thereby form tightly secured in the radial and axial direction and can be taken out of the receiving slot 27 in the peripheral direction and can be pushed back in for the purpose of assembly or exchange. A holding screw 34 is provided for securing in the peripheral direction. The holder 26 is fastened to the protective shield 2 by the holding screw 34.

In the embodiment shown, the cut-to-length knife is supported pivotally on the holder 26 and therefore on the protective shield 2. A pivot axis 14 lies approximately parallel to the upward direction 9 and therefore to the rotational axis 3 shown in FIG. 1. The cut-to-length knife is supported so as to be pivotal back and forth in correspondence to a double arrow 35 between a cutting position 11 and a rest position 12 about the pivot axis 14. A return spring 25 of the cut-to-length knife 7 is supported from the interior against the peripheral wall 15 and pretensions the cut-to-length knife 7 out of the cutting position 11 into the rest position 12. Details of the cut-to-length knife 7 are described hereinafter with respect to FIG. 8.

The cutting filament 5 shown in FIG. 1 is moved on a circular path in the rotational direction 10 and passes over a cutting circle 6 indicated in FIG. 2. The cutting circle 6 has a constructively pregiven nominal radius R. It is wanted that the cutting filament 5 (FIG. 1) has a length which leads to a formation of the cutting circle 6 having the nominal radius R. The cut-to-length knife 7 is provided in order to produce a corresponding cutting to length when the cutting filament 5 (FIG. 1) has an excessive length. In the embodiment shown, the cut-to-length knife with its cutting edge 8 is arranged for this purpose radially outside of the cutting circle 6. In the cutting position 11, the cutting edge 8 lies in the plane of the cutting circle 6 and therefore at the nominal radius R with respect to the rotational axis 3. In the rest position 12, the cutting edge 8 of the cut-to-length knife 7 remains in the plane of the cutting circle 6 as a consequence of the vertical alignment of the pivot axis 14; however, the cutting edge 8 lies at a radial distance outside of the cutting circle 6 delimited by the nominal radius R.

Figure 3:
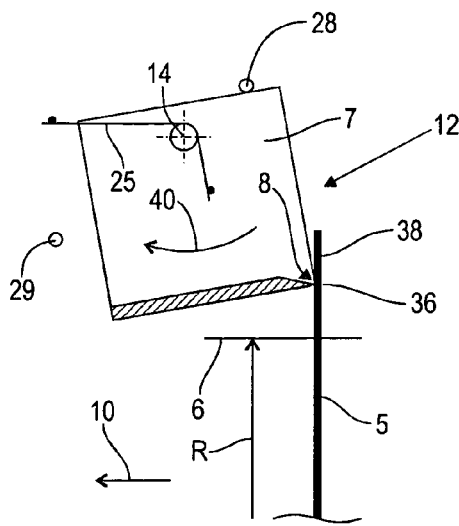
FIG. 3 is a schematic plan view of the cut-to-length knife of FIG. 2 shown in the rest position during a first time impact of the excessively long cutting filament.
Figure 4:
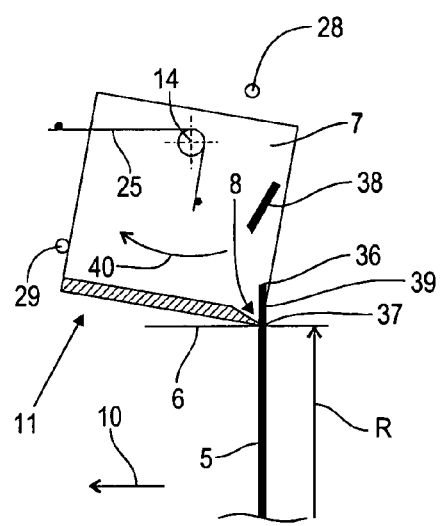
FIG. 4 shows the arrangement of FIG. 3 with the cut-to-length knife in the cutting position and the cutting filament impacting again.

The functional principle of the arrangement shown in FIG. 2 becomes apparent from the schematics of the cut-to-length knife 7 shown in FIGS. 3 and 4. FIGS. 3 and 4 show the same arrangement, wherein, in FIG. 3, the cut-to-length knife 7 is shown in the rest position 12 and, in FIG. 4, the cut-to-length knife 7 is shown in the cutting position 11. In both FIGS. 3 and 4 the same features are identified by the same reference numerals.

The cut-to-length knife 7 is shown in the rest position 12 in FIG. 3 and is pivotally supported about the pivot axis 14. A return spring 25 is configured by way of example as a leg spring. The return spring 25 presses the cut-to-length knife 7 against a stop 28 opposite to a pivot direction indicated by arrow 40. The pivot path of the cut-to-length knife 7 is delimited by the stop 28 opposite to the direction of the arrow 40. The cut-to-length knife 7 with the cutting edge 8 assumes the rest position 12 shown when coming into contact with the stop 28. All components of the assembly unit comprising the cut-to-length knife 7 and the holder 26 (FIG. 2) lie radially outside of the cutting circle 6 delimited by the nominal radius R.

After excessive wear or shortening of the cutting filament 5 caused by wear, the cutting filament is pulled out with an excess length, for example, manually, from the cutterhead 4 (FIG. 1) in correspondence to the illustration of FIG. 3. When the free-cutting tool 1 is started up, the excessively long cutting filament 5 is moved in the rotational direction 10 in correspondence to FIG. 3 and impacts against the cutting edge 8 of the cut-to-length knife 7 disposed in the rest position 12. The cutting edge 8 then carries out a first severance cut 36 which lies radially outside of the nominal radius R.

The cutting edge 8 lies radially within the pivot axis 14 in the rest position 12 referred to the nominal radius R and the pivot axis 14. Furthermore, the cutting edge 8 lies running ahead opposite to the pivot direction 40 and the rotational direction 10 with reference to the pivot axis 14. This arrangement causes the cut-to-length knife 7 to experience an impact by the cutting filament 5 against the cutting edge 8 when the cutting filament 5 impacts on the cutting edge 8 in correspondence to the illustration of FIG. 3. The cutting filament 5 pivots the cut-to-length knife 7 opposite to the pretensioning force of the return spring 25 in the direction of arrow 40.

The spring pretensioning of the return spring 25 is so matched to the pivoting mass inertia of the cut-to-length knife 7 and to the operating rpm of the cutterhead 4 (FIG. 1), which adjusts itself during the cut-to-length operation of the cutting filament 5, that, after a further revolution of the cutterhead 4 (FIG. 1), the cut-to-length knife 7 assumes at least approximately the cutting position 11 shown in FIG. 4. Here, the pivot path of the cut-to-length knife 7 is delimited by a stop 29 in the direction of the arrow 40. The previously described running ahead arrangement of the cutting edge 8 referred to the pivot axis 14 leads to the situation that the cutting edge 8 is displaced into the cutting position 11 relative to the rest position 12 shown in FIG. 3 with a radially inwardly directed component and with a peripheral component running in the rotational direction 10. The stop 29 is so positioned that the cutting edge 8 of the cut-to-length knife 7 lying against the stop 29 lies precisely within the periphery of the cutting circle 6 having the nominal radius R.

The first segment 38 is separated in the previous impact position of the cutting filament 5 (shown in FIG. 3) and is catapulted outwardly; whereas, in correspondence to FIG. 4, the cutting filament 5 impacts once again against the cutting edge 8 in the next-following revolution. A second severance cut 37 is carried out which separates a second segment 39 from the cutting filament 5. The second severance cut 37 lies on the peripheral contour of the cutting circle 6 having the nominal radius R corresponding to the position of the cutting edge 8 whereby the cutting filament 5 reaches its nominal length.

It can happen that the second severance cut 37 is not cleanly executed as a consequence of an rpm of the cutterhead 4 (FIG. 4) which is too low or a cutting edge 8 which has become blunt and the cutting filament 5 or cutting filaments 5 still retain an excess length in the radial direction. In this case, the above-described dynamic design of the cut-to-length knife 7 and the return spring 25 leads to the situation that the cut-to-length knife 7 remains so long in the cutting position 11 shown in FIG. 4 until the trailing cutting filament 5, which is offset by 180°, after a half revolution or the same cutting filament 5 finally is cut to length with the nominal radius R after one or several further revolutions and passes over the cutting circle 6 having the nominal radius R. Thereafter, the free end of the cutting filament 5 no longer impacts against the cutting edge 8. The cut-to-length knife 7 is no longer subjected to an impact in the pivot direction 40. The return spring 25 is under increased pretensioning and returns the cut-to-length knife 7 from the cutting position 11 shown in FIG. 4 back into the rest position 12 shown in FIG. 3 opposite to the pivot direction 40.

The cutting filament 5, which is brought to the nominal dimension, then runs with its outer end along the peripheral contour of the cutting circle 6 and therefore at a radial distance to the cut-to-length knife 7 (corresponding to the illustration of FIG. 3) in the rest position 12 shown in FIG. 3. The radial distance between the outer end of the cutting filament 5 and the cut-to-length knife 7 prevents a generation of noise by the passing cutting filament 5. The radial distance can be further increased in that the cut-to-length operation described above is carried out at an rpm as high as possible of the cutterhead 4 (FIG. 1). The occurring increased centrifugal forces elastically stretch the cutting filament 5. The execution of the severance cut 37 (FIG. 4) in the elastically expanded state of the cutting filament 5 causes an adequate radial distance to be achieved to the cut-to-length knife 7 even at high working rpms.

Figure 5:
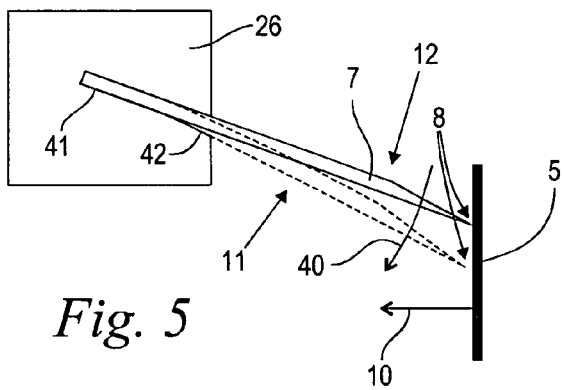
FIG. 5 is a schematic of an embodiment wherein the cut-to-length knife is spring moveable elastically between the rest and cutting positions.
Figure 6:
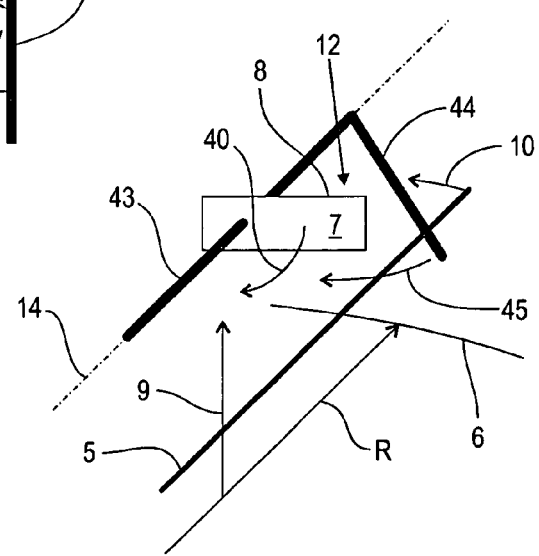
FIG. 6 is a schematic perspective view of a variation wherein a cut-to-length knife is moveable about a radially extending pivot axis.

Two further embodiments are schematically shown in FIGS. 5 and 6 for explaining the inventive concept. Corresponding to the schematic plan view of FIG. 5, an elastically resiliently configured cut-to-length knife 7 is held form-tight in a knife receptacle 41 of the holder 26. The knife receptacle 41 expands in the direction of the cutting edge 8 in a funnel shape while forming a surface 42 which lies radially inwardly and is curved convexly. The elastically resilient cut-to-length knife 7 is positioned inclined against the rotational direction 10 of the cutting filament 5 with a directional component directed radially inwardly. In the unloaded rest position 12, the foot region of the cut-to-length knife 7 lies at a distance to the arcuate surface 42. The opposite-lying surface of the knife receptacle, which is formed straight and radially outwardly, functions as a stop in the sense of the stop 28 of FIG. 3.

The inclined position arrangement of the cut-to-length knife 7 imparts a pulse to the cutting edge 8 when there is an impact of the excessively long cutting filament 5 which causes the cut-to-length knife 7 to rebound in the pivot direction 40 with a radial component directed inwardly. The arcuate surface 42 corresponds with respect to its function to the stop 29 of FIG. 4 and delimits the rebound path of the cut-to-length knife 7 inwardly. In the cutting position 11 shown in phantom outline and resiliently biased inwardly, the cutting edge 8 lies radially further inwardly with respect to the rest position 12. The cut-to-length operation of the cutting filament 5 then takes place in correspondence to the principle shown in FIGS. 3 and 4.

The cut-to-length knife 7 is attached to a rigid support shaft 43 in the embodiment of FIG. 6. The support shaft 43 extends as a pivot axis 14 for the cut-to-length knife 7 in radial direction parallel to the nominal radius R but in the up direction 9 above the cutting circle 6. The perspective view of FIG. 6 shows that the cut-to-length knife 7 with the cutting edge 8 is mounted in the radial direction in the nominal radius R to the rotational axis 3 (FIG. 1); however, the knife 7 lies in the position 12 shown as a consequence of the axial distance above and therefore outside of the cutting circle 6.

Radially outside of the cutting circle 6 delimited by the nominal radius R, the support shaft 43 is bent downwardly to form a leg 44 opposite the up direction 9 and is so dimensioned in its length that the cutting filament 5 impacts on the leg 44 on its circular path in the rotational direction 10 when there is an excessive length. The leg 44 is moved along in the direction of arrow 45 with the rotational direction 10. The cut-to-length knife 7 as a rigid unit with the support shaft 43 and the leg 44 is folded downwardly in the pivot direction 40. The cutting edge 8 is pivoted into the plane of the cutting circle 6 having the nominal radius R when assuming the cutting position 11 (not shown) and cuts off the subsequently impacting cutting filament 5 with the nominal radius R. In the remaining features and reference numerals, the arrangements of FIGS. 5 and 6 correspond to those of FIGS. 1 to 4. In addition to the embodiments of the cut-to-length knife 7 previously shown as pivotable, a linear guidance of the cut-to-length knife 7 can be practical.

Figure 7:
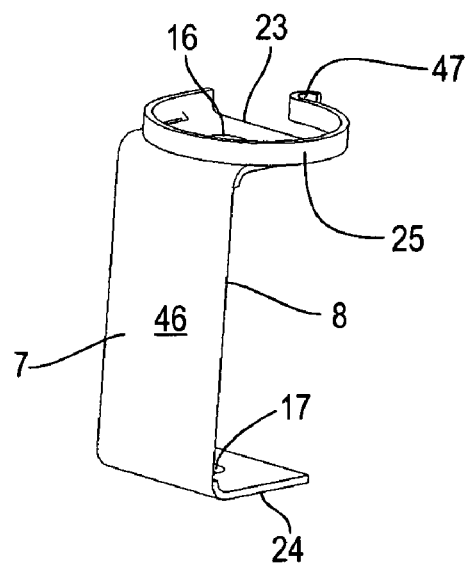
FIG. 7 is a perspective detail view of a cut-to-length knife with a return spring formed thereon as one piece with the return spring to be supported on the holder of the cut-to-length knife; and, FIG. 8 is a variation of the embodiment of FIG. 7 with a return spring corresponding to that shown in FIG. 2 and provided for support on the protective shield.
Figure 8:
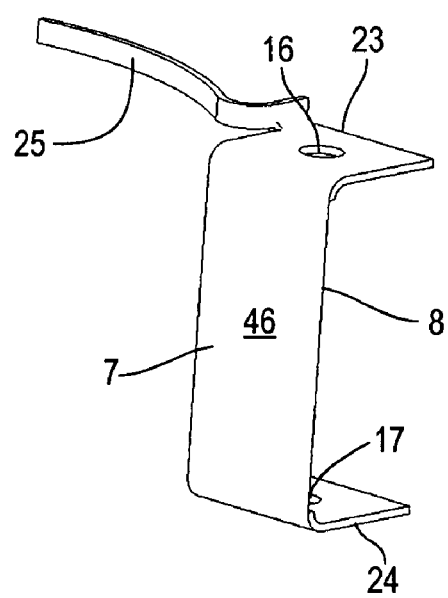

FIGS. 7 and 8 show different embodiments of the cut-to-length knife 7 of FIGS. 1 to 4. In both embodiments, the cut-to-length knife 7 is configured of spring steel as one piece with the return spring 25 as a bent sheet metal component. The U-shaped cut-to-length knife 7 includes a planar middle piece 46 which at both ends extends into free ends (23, 24) which are bent over at right angles. Respective support locations (16, 17) in the form of coaxial bores are formed in the two free ends (23, 24) and run parallel to the plane of the middle piece 46. In the assembled condition, the pivot axis 14 (FIG. 2) runs through the bores. In the assembled state, a pin, a screw or the like can form a double support of the cut-to-length knife 7 in combination with the above-mentioned bores of the support locations (16, 17). The planar middle piece 46 carries the sharpened knife edge 8 on its edge running between the two free ends (23, 24). The cutting edge is linear and runs parallel to the pivot axis 14 (FIG. 2).

In the embodiment of FIG. 7, the return spring 25 is formed as one piece on the cut-to-length knife 7 and is configured likewise from bent spring steel sheet metal. The return spring 25 has an annular shape about the support location 16 and, at its free end, a holding clamp 47 configured by being bent over. The holding clamp 47 is provided for attachment to the holder 26 of the protective shield 2 (FIG. 2).

Alternatively, and in correspondence to the embodiment of FIG. 6, the return spring 25 can be bent away from the support location 16. The return spring 25 is provided for bracing against the peripheral wall 15 of the protective shield 2 (FIG. 2). The embodiment of FIG. 8 corresponds to that of FIG. 7 with respect to the other features and reference numerals.

It is understood that the foregoing description is that of the preferred embodiments of the invention and that various changes and modifications may be made thereto without departing from the spirit and scope of the invention as defined in the appended claims.

What is claimed is:

1. A protective shield assembly for a free-cutting tool including a cutterhead rotatably driven about a rotational axis, the cutterhead carrying a cutting filament rotating with the cutterhead and extending approximately radially of the rotational axis as said cutterhead rotates, the cutting filament defining a cutting circle having a nominal radius and a peripheral region, the protective shield assembly comprising:

a protective shield at least partially covering said cutting circle;

a cut-to-length knife moveably mounted on said protective shield in said peripheral region of said cutting circle;

said cut-to-length knife having a cutting edge for cutting said cutting filament to a length corresponding to said nominal radius; and, said cut-to-length knife being pivotally moveable back and forth between a rest position wherein said cutting edge lies outside of said cutting circle and a cutting position wherein said cutting edge lies in the plane of said cutting circle at a location corresponding to said nominal radius whereat said cutting filament is cut back to have said nominal radius and said cutting filament runs at a radial distance from said cut-to-length knife when said cut-to-length knife is again in said rest position thereof; and means for storing energy to automatically return said cut-to-length knife to said rest position after said filament is cut back to said nominal radius.

2. A protective shield assembly for a free-cutting tool including a cutterhead rotatably driven about a rotational axis, the cutterhead carrying a cutting filament rotating with the cutterhead and extending approximately radially of the rotational axis as said cutterhead rotates, the cutting filament defining a cutting circle having a nominal radius and a peripheral region, the protective shield assembly comprising:

a protective shield at least partially covering said cutting circle;

a cut-to-length knife moveably mounted on said protective shield in said peripheral region of said cutting circle;

said cut-to-length knife having a cutting edge for cutting said cutting filament to a length corresponding to said nominal radius;

said cut-to-length knife being moveable back and forth between a rest position wherein said cutting edge lies outside of said cutting circle and a cutting position wherein said cutting edge lies in the plane of said cutting circle at a location corresponding to said nominal radius; and, wherein a movement of said cut-to-length knife from said rest position into said cutting position is caused by the action of an excess length of said cutting filament on said cut-to-length knife as said cutting filament having said excess length rotates about said rotational axis.

3. The protective shield assembly of claim 2, further comprising a spring for biasing said cut-to-length knife out of said cutting position into said rest position.

4. The protective shield assembly of claim 3, further comprising pivot means for pivotally supporting said cut-to-length knife on said protective shield so as to permit said cut-to-length knife to pivot between said cutting position and said rest position; and, said pivot means defining a pivot axis.

5. The protective shield assembly of claim 4, wherein said pivot axis is at least approximately parallel to said rotational axis with said cutting edge lying in the plane of said cutting circle when said cut-to-length knife is in each of said cutting and rest positions; and, said cut-to-length knife being so mounted on said protective shield that said cutting edge, referred to said pivot axis in said rest position of said cut-to-length knife, is arranged to move ahead of said cutting filament in a pivot direction opposite to the rotational direction of said cutting filament.

6. The protective shield assembly of claim 5, said pivot means including first and second pivot supports; and, said cut-to-length knife having first and second ends pivotally supported at corresponding ones of said first and second pivot supports.

7. The protective shield assembly of claim 6, wherein said cut-to-length knife is configured to have a U-shape having two legs defining said first and second ends pivotally supported on corresponding ones of said pivot supports.

8. The protective shield assembly of claim 6, said spring having a pretensioning matched to the mass inertia of said cut-to-length knife and the operating rpm of said cutterhead in such a manner that said cut-to-length knife deflected out of said rest position remains in the region of said cutting position at least over the time span of a half a revolution of said cutterhead.

9. The protective shield assembly of claim 3, wherein said cut-to-length knife is made of spring steel and is configured as one piece with said spring.

10. The protective shield assembly of claim 3, further comprising a holder for supporting said cut-to-length knife therein; and, attachment means for attaching said holder to said protective shield.

11. The protective shield assembly of claim 10, said attachment means including a slot formed in said protective shield; and, a mounting element attached to said holder for engaging said slot to hold said holder and said cut-to-length knife in a form-tight manner.

12. The protective shield assembly of claim 2, further comprising respective stops to delimit the displacement path between said rest position and said cutting position.

* * * * *